United States Patent

Ulbrich

[11] 3,893,734
[45] July 8, 1975

[54] THRUST BEARING
[75] Inventor: Dieter Ulbrich, Cologne, Germany
[73] Assignee: Ford Motor Company, Dearborn, Mich.
[22] Filed: Apr. 1, 1974
[21] Appl. No.: 457,048

[52] U.S. Cl................................ 308/23; 308/167
[51] Int. Cl.² ............................................. F16C 9/02
[58] Field of Search....................... 308/23, 167, 179

[56] References Cited
UNITED STATES PATENTS
| | | | |
|---|---|---|---|
| 1,355,706 | 10/1920 | Snyder | 308/167 |
| 3,390,925 | 7/1968 | Fangman | 308/23 X |
| 3,782,792 | 1/1974 | Pfleiderer | 308/23 |

Primary Examiner—M. Henson Wood, Jr.
Assistant Examiner—Gene A. Church
Attorney, Agent, or Firm—Roger E. Erickson; Keith L. Zerschling

[57] ABSTRACT

A half-ring thrust bearing for the axial location of shafts in housings, particularly, for the axial location of crankshafts in cylinder blocks. The thrust bearing is seated in a fully circular or annular seat and is prevented from rotating relative to the seat by a tag or tang extending axially or radially from one end of the half-ring.

10 Claims, 2 Drawing Figures

THRUST BEARING

BACKGROUND AND SUMMARY OF THE INVENTION

In known thrust bearing systems, particularly for internal combustion engine crankshafts, upper and lower half-rings are assembled in a circular or annular seat which is continuously machined in the bearing web and the bearing cover or cap. The thrust rings are secured against rotation by a tang or projection which extends radially into a notch in the bearing cap. With this arrangement, it has been found that substantially all of the thrust load is carried by only one of the two half-rings rather than being divided substantially equally between both half rings. This concentration of loading on a single half-ring is particularly characteristic during the braking-in period of the engine and results from the slight dissimilarities in the half-rings as permitted by the normal engine tolerances. Attempts have therefore been made to provide only a single half-ring thrust bearing at each side of the bearing web and thus to economize on the number of half-rings needed for an engine. To secure half-ring bearings from rotation or displacement within the continuous circular seats, a projection or tang is provided in known bearings that extends from a central portion of the half-ring and into a notch in the bearing cover. It was found, however, that such a half-ring still experienced shifting out of its circular seat and was displaced radially relative to the shaft resulting in wear at the radius edges of the bearing pins. These difficulties could have been resolved by providing a half circle seat for the thrust bearing machined only in the bearing web and not in the bearing cover so that the bearing cover would have supported the half-ring at its two ends. However, machining a semicircular seat is undesirable in that it would result in substantial changes to existing engine manufacturing machinery and in significant retooling costs.

The object of this invention, therefore, is to provide a half-ring thrust bearing arrangement which is reliably secured in a radial position in a circular bearing seat continuously machined in the bearing web and the bearing cap. In accordance with the invention, this object is achieved by providing the half-ring thrust bearing with a radially or axially extending tang or tag on at least one end which protrudes into and is a recess in the bearing web or the bearing cap or therebetween. Preferably, the tang is clamped between the web and the cap.

An internal combustion engine constructed in accordance with this invention includes an engine block having crankshaft support means and a crankshaft mounted within the support means to rotate about a given axis. Thrust bearings separate the axial adjacent surfaces of the crankshaft support means and the crankshaft. An annular or circular seat is formed on the crankshaft support means and receives a half-ring thrust bearing. The bearing includes a tang which protrudes from one end of the half-ring into a recess formed in the crankshaft support means adjoining the annular seat. The tang prevents the thrust bearing from angular or radial displacement relative to the annular seat.

DETAILED DESCRIPTION OF THE PREFERRED EMBODIMENT

Figure 1:
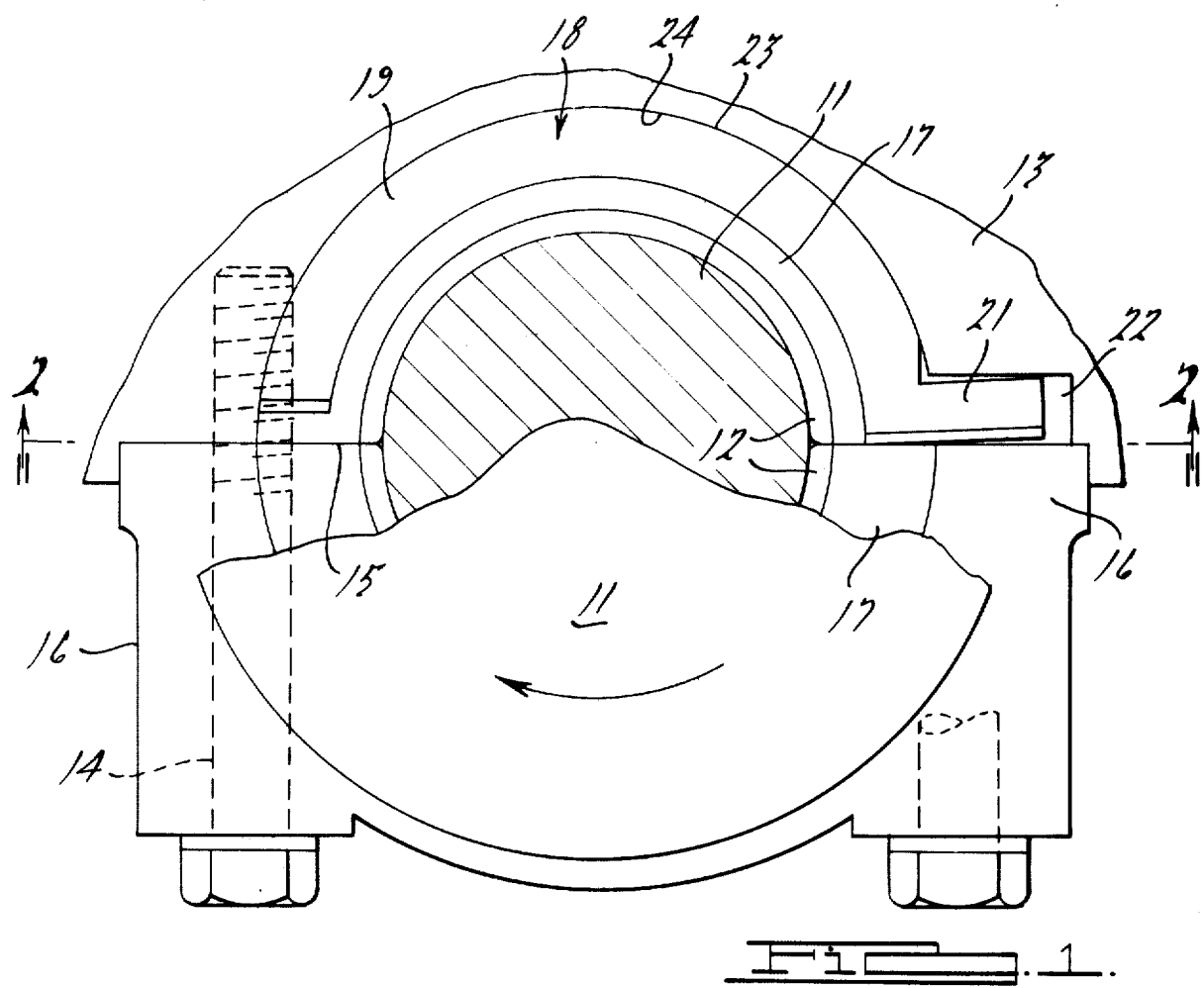
FIG. 1 is an axial view of the thrust bearing and the related engine structure with parts of the crankshaft broken away.
Figure 2:
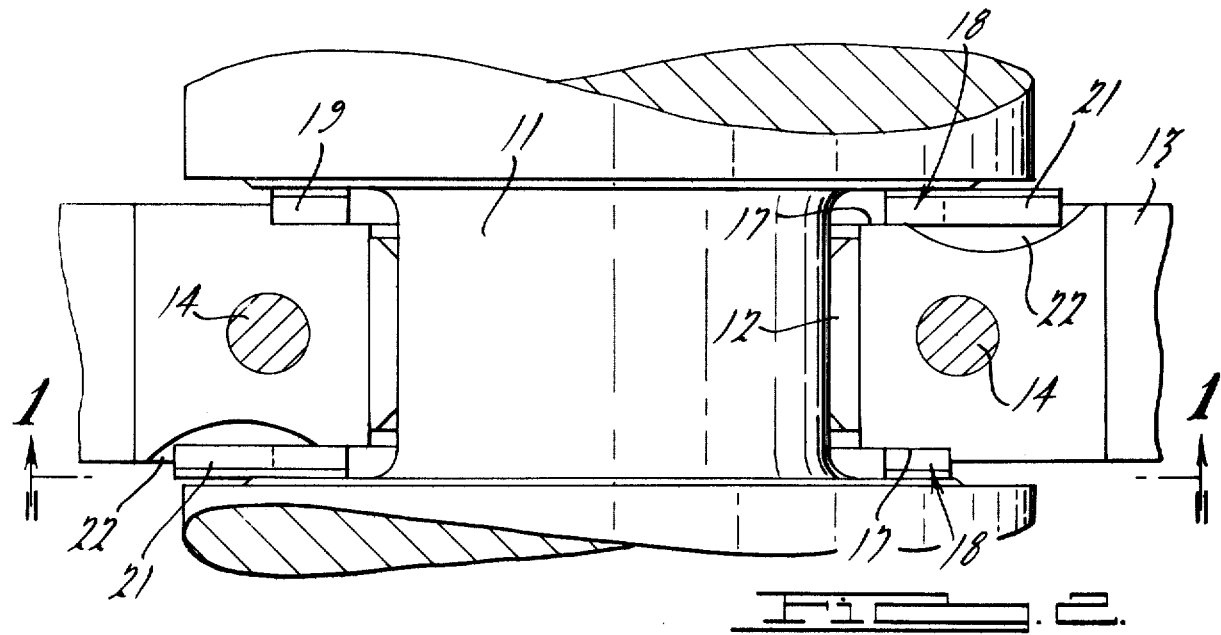
FIG. 2 is a view taken along line 2—2 of FIG. 1.

A crankshaft 11 is carried in semi-cylindrical plain bearings 12 by support means comprising a bearing web 13 of the engine block and a bearing cap 16 attached to the web by suitable threaded fasteners such as cap screws 14. The bearing support means are generally perpendicular to the axis of the crankshaft. On the axial sides of the bearing web and the bearing cap there are formed circular or annular seats 17 for centering and retaining half-ring thrust bearing 18. The seats 17 also are perpendicular to the crankshaft axis. Each seat is continuously and simultaneously machined on the web and the cap and is coaxial with the bearings 12 and the crankshaft axis. The thrust bearing 18 includes semi-annular portion 19 and a tang or tag 21 extending generally radially from at least one end of the portion 19. The tang is at an angle of about 2° relative to the horizontal diametrical parting plane 13 separating the adjoining surfaces of the web 13 and the cap 16.

The bearing web 13 contains recesses 22 which extend radially outwardly from the annular seats 17, as shown in the attached drawing. Each of the recesses 22 receives one of the tangs 21 of the two identical half-ring thrust bearings 18 which are positioned on both sides of the bearing support means. The depth of the recess 22 is slightly less than the overall height of the tan 21 measured perpendicularly from the diametrical parting plane 15 between the bearing cap 16 and the web 13. Thus, as the bearing cap is tightened to the bearing web, the outer circumferential edge 23 of the half thrust ring bears against the peripheral cylindrical wall 24 of the annular recess to assure positive retention of the half thrust ring within the annular recess 17.

It should be noted that the preferred embodiment of the half-ring thrust bearing 18 shown in the attached drawings has advantage that it can be placed in position or rotated into position after the crankshaft has been assembled into the engine block. It can also be seen that depending on the design of the bearing web and the bearing cover and the method of assembly, it is possible to use half-ring thrust bearings with axially directed tangs.

The size and shape of the tang 21 as well as its angle relative to the parting plane 15 in order to satisfy varied installation requirements.

When using half-ring thrust bearings with only one radially extending tang, the arrangement will preferably be such that the free end of the half-ring, which to withstand the highest axial load, is in opposition to the direction of rotation of the shaft or, alternately stated, the arrangement will be such that a point on the crankshaft moves from the free end of the half-ring to the tang end so that the half-ring thrust bearing is forced into the periphery of the annular seat as a result of crankshaft motion.

It thus may be seen that a half-ring thrust bearing constructed in accordance with this invention enables cost saving continuous machining of the thrust bearing seat and yet provides for the half-rings to be reliably secured in position relative to the annular seat. It can also be seen that when identical half-ring thrust bearings are used incorrect assembly of the bearings having a liner or layer of anti-friction material placed on one side only is prevented.

Modifications and alterations will occur to those skilled in the art which are included within the scope of the following claims.

I claim:

1. Internal combustion engine structure including an engine block having crankshaft support means, a crankshaft mounted within said support means to rotate about a given axis, thrust bearing means separating axially adjacent parallel surfaces on said crankshaft support means and on said crankshaft, said adjacent surface on said bearing support means comprising an annular seat, said thrust bearing means including a partial annulus positioned between said adjacent surfaces, said bearing including a tang protruding from one end of said partial annulus positioned between and engaging said adjacent surfaces, a recess formed in said crankshaft support means adjoining said annular seat, said tang being received within said recess to prevent said thrust bearing from angular displacement relative to said annular seat.

2. Internal combustion engine structure including an engine block having crankshaft support means, a crankshaft mounted within said support means to rotate about a given axis, said crankshaft support means including a web and a cap and being disposed generally perpendicularly to said axis, said cap being secured to said web by suitable threaded fasteners, said cap and web defining a radially inwardly directed cylindrical surface, positioned about said crankshaft, an annular seating recess formed in said crankshaft support means, said seating recess having an annular surface pependicular to and concentric with said axis, said surface extending radially outwardly from said cylindrical surface and terminating at a circumferential edge, a second recess formed in each of said support means between said web and said cap adjoining said annular recess, a thrust bearing comprising a half-ring and a tang protruding from at least one end thereof, said half-ring having an outer radius essentially equal to that of the circumferential edge of said annular recess, said annular recess receiving a half-ring said half-ring axially separating an axially directed surface of said crankshaft from said annular recess, said tang being received within said second recess between web and said cap, said tang preventing angular displacement of said thrust bearing relative to said annular recess.

3. Internal combustion engine structure according to claim 2, said tang protruding radially from at least one end of said thrust bearing.

4. Internal combustion engine structure according to claim 3, said second recess being formed in said web and being defined in part by said cap, said recess extending in a generally radial direction relative to said axis.

5. Internal combustion engine structure according to claim 4, said tang being clamped with said second recess when said cap is tightly secured to said web by means of said fasteners.

6. Internal combustion engine structure according to claim 5, said cap and said web being separated along a diametrical line of said cylindrical surface, said tang being skewed relative to said diametrical line so that when said cap is installed the outer radius of said half-ring bears against the circumferential edge of said annular recess.

7. Internal combustion engine structure according to claim 2, one said annular seating recess being formed on each axial directed side of said crankshaft support means, a pair of thrust bearings positioned within the annular seating recesses of each crankshaft support means, the tangs of the thrust bearings received within the annular seating recesses of each crankshaft support means protruding in substantially diametrically opposite directions.

8. Internal combustion engine structure according to claim 2, said thrust bearing being positioned within the portion of said annular recess formed in said web.

9. Internal combustion engine structure according to claim 7, said thrust bearings being positioned within the portions of said annular recesses formed in said web.

10. Internal combustion engine structure according to claim 5, said cap and said web being separated along a diametrical line of said cylindrical surface, said tang being skewed relative to said diametrical line.

* * * * *